(12) United States Patent
Wang et al.

(10) Patent No.: US 7,707,826 B2
(45) Date of Patent: May 4, 2010

(54) SYSTEM FOR CONTROLLING TRIGGERING OF ADSORBER REGENERATION

(75) Inventors: Yue Yun Wang, Troy, MI (US); Sriram Satya Srinivas Popuri, Greenwood, IN (US); Michael J. Ruth, Franklin, IN (US); Michael J. Cunningham, Greenwood, IN (US); Joan M. Wills, Nashville, IN (US); Jer-Sheng J. Chen, Naperville, IL (US); Samuel C. Geckler, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 198 days.

(21) Appl. No.: 11/593,802

(22) Filed: Nov. 7, 2006

(65) Prior Publication Data

US 2008/0104947 A1  May 8, 2008

(51) Int. Cl.
*F01N 3/00* (2006.01)
(52) U.S. Cl. .............................. 60/295; 60/274; 60/286; 60/297
(58) Field of Classification Search ................... 60/274, 60/278, 280, 286, 295, 297, 301
See application file for complete search history.

(56) References Cited

U.S. PATENT DOCUMENTS

| | | | |
|---|---|---|---|
| 4,222,236 A | 9/1980 | Hegedus et al. |
| 5,473,887 A | 12/1995 | Takeshima et al. |
| 5,529,048 A | 6/1996 | Kurihara et al. |
| 5,531,203 A | 7/1996 | Komatsuda et al. |
| 5,600,947 A | 2/1997 | Cullen |
| 5,635,142 A | 6/1997 | Ichiki et al. |
| 5,743,084 A | 4/1998 | Hepburn |
| 5,784,879 A | 7/1998 | Dohta et al. |
| 5,878,567 A | 3/1999 | Adamczyk, Jr. et al. |
| 5,894,725 A | 4/1999 | Cullen et al. |
| 5,915,359 A | 6/1999 | Meyer et al. |
| 6,185,935 B1 | 2/2001 | Dickers et al. |
| 6,199,372 B1 | 3/2001 | Wakamoto |
| 6,202,406 B1 | 3/2001 | Griffin et al. |
| 6,205,773 B1 | 3/2001 | Suzuki |
| 6,212,884 B1 | 4/2001 | Ohuchi et al. |
| 6,216,449 B1 | 4/2001 | Strehlau et al. |
| 6,244,046 B1 | 6/2001 | Yamashita |
| 6,266,957 B1 | 7/2001 | Nozawa et al. |
| 6,272,848 B1 | 8/2001 | Okude et al. |
| 6,308,515 B1 | 10/2001 | Bidner et al. |
| 6,311,482 B1 | 11/2001 | Yamashita |
| 6,318,075 B1 | 11/2001 | Gunther et al. |
| 6,327,847 B1 | 12/2001 | Surnilla et al. |
| 6,327,848 B1 | 12/2001 | Poggio et al. |
| 6,345,498 B2 | 2/2002 | Yonekura et al. |
| 6,360,530 B1 | 3/2002 | Robichaux et al. |
| 6,370,868 B1 | 4/2002 | Kolmanovsky et al. |

(Continued)

*Primary Examiner*—Binh Q Tran
(74) *Attorney, Agent, or Firm*—Krieg DeVault LLP

(57) ABSTRACT

A system, method, and software for triggering regeneration of an adsorber connected with a flow of exhaust from an engine. An exhaust sulfur flow rate module estimates a sulfur accumulation rate associated with an adsorber as a function of a flow of fuel. A sulfur removal rate module estimates a sulfur removal rate associated with the adsorber. An accumulated sulfur loading module includes a counter the value of which is increased as a function of the sulfur accumulation rate and decreased as a function of the sulfur removal rate. A combustion manager module controls an engine to regenerate the adsorber once the counter reaches an upper threshold value.

24 Claims, 6 Drawing Sheets

U.S. PATENT DOCUMENTS

| | | |
|---|---|---|
| 6,374,597 B1 | 4/2002 | Bidner et al. |
| 6,389,802 B1 | 5/2002 | Berger et al. |
| 6,401,454 B2 | 6/2002 | Takano et al. |
| 6,408,620 B2 | 6/2002 | Boegner et al. |
| 6,422,003 B1 | 7/2002 | Ament et al. |
| 6,427,439 B1 | 8/2002 | Xu et al. |
| 6,434,928 B1 | 8/2002 | Manaka |
| 6,438,944 B1 | 8/2002 | Bidner et al. |
| 6,451,602 B1 | 9/2002 | Popoff et al. |
| 6,453,663 B1 | 9/2002 | Orzel et al. |
| 6,453,664 B2 | 9/2002 | Ishii et al. |
| 6,463,733 B1 | 10/2002 | Asik et al. |
| 6,467,259 B1 | 10/2002 | Surnilla et al. |
| 6,477,832 B1 | 11/2002 | Surnilla et al. |
| 6,481,199 B1 | 11/2002 | Bidner et al. |
| 6,487,849 B1 | 12/2002 | Bidner et al. |
| 6,487,850 B1 | 12/2002 | Bidner et al. |
| 6,490,858 B2 | 12/2002 | Barrett et al. |
| 6,490,860 B1 | 12/2002 | Farmer et al. |
| 6,497,092 B1 | 12/2002 | Theis |
| 6,502,387 B1 | 1/2003 | Asik et al. |
| 6,502,391 B1 | 1/2003 | Hirota et al. |
| 6,513,319 B2 | 2/2003 | Nozawa et al. |
| 6,513,322 B2 | 2/2003 | Ohuchi et al. |
| 6,531,099 B1 | 3/2003 | Held |
| 6,562,753 B2 | 5/2003 | Miyoshi et al. |
| 6,568,177 B1 | 5/2003 | Surnilla |
| 6,588,205 B1 | 7/2003 | Kumagai et al. |
| 6,594,990 B2 | 7/2003 | Kuenstler et al. |
| 6,615,577 B2 | 9/2003 | Meyer et al. |
| 6,644,021 B2 | 11/2003 | Okada et al. |
| 6,651,422 B1 | 11/2003 | LeGare |
| 6,684,627 B2 * | 2/2004 | Mizuno et al. ................ 60/274 |
| 6,688,101 B2 | 2/2004 | Isobe et al. |
| 6,766,642 B2 | 7/2004 | Binder et al. |
| 6,792,346 B2 | 9/2004 | Takebayashi et al. |
| 6,813,879 B2 | 11/2004 | Watner et al. |
| 6,813,882 B2 | 11/2004 | Hepburn et al. |
| 6,823,658 B2 | 11/2004 | Kuroda et al. |
| 6,823,664 B2 | 11/2004 | Nakatani et al. |
| 6,823,665 B2 | 11/2004 | Hirota et al. |
| 6,829,888 B2 | 12/2004 | Kuenstler et al. |
| 6,871,492 B2 | 3/2005 | Huynh et al. |
| 6,889,497 B2 | 5/2005 | Schnaibel et al. |
| 6,901,749 B2 | 6/2005 | Hashimoto |
| 6,941,748 B2 | 9/2005 | Pott et al. |
| 6,962,045 B2 * | 11/2005 | Kitahara et al. ................ 60/295 |
| 6,988,360 B2 * | 1/2006 | Kimura et al. ................ 60/286 |
| 6,990,799 B2 | 1/2006 | Bidner et al. |
| 7,036,304 B2 * | 5/2006 | Sakai ......................... 60/285 |
| 7,121,086 B2 | 10/2006 | Nishii et al. |
| 7,134,274 B2 | 11/2006 | Asanuma |
| 7,165,394 B2 * | 1/2007 | Toshioka et al. ............. 60/295 |
| 7,191,590 B2 * | 3/2007 | Nagaoka et al. ............. 60/285 |
| 2001/0007191 A1 | 7/2001 | Ohuchi et al. |
| 2001/0010149 A1 | 8/2001 | Ishii et al. |
| 2001/0013223 A1 | 8/2001 | Boegner et al. |
| 2001/0032456 A1 | 10/2001 | Yonekura et al. |
| 2001/0035008 A1 | 11/2001 | Nozawa et al. |
| 2002/0056268 A1 | 5/2002 | Isobe et al. |
| 2002/0073696 A1 | 6/2002 | Kuenstler et al. |
| 2002/0141908 A1 | 10/2002 | Miyoshi et al. |
| 2002/0170287 A1 | 11/2002 | Hirota et al. |
| 2002/0178716 A1 | 12/2002 | Hepburn et al. |
| 2002/0189235 A1 | 12/2002 | Meyer et al. |
| 2002/0189580 A1 | 12/2002 | Surnilla et al. |
| 2003/0000205 A1 | 1/2003 | Lewis et al. |
| 2003/0037541 A1 | 2/2003 | Farmer et al. |
| 2003/0056497 A1 | 3/2003 | Kuenstler et al. |
| 2003/0056499 A1 | 3/2003 | Binder et al. |
| 2003/0101713 A1 | 6/2003 | Dalla Betta et al. |
| 2003/0106306 A1 | 6/2003 | Nakatani et al. |
| 2003/0106307 A1 | 6/2003 | Okada et al. |
| 2003/0131591 A1 | 7/2003 | Pott et al. |
| 2003/0134425 A1 | 7/2003 | Ceccarini et al. |
| 2003/0177761 A1 | 9/2003 | Wagner et al. |
| 2003/0212484 A1 | 11/2003 | Takebayashi et al. |
| 2003/0213235 A1 | 11/2003 | Kitahara et al. |
| 2004/0003587 A1 | 1/2004 | Sakai |
| 2006/0137327 A1 | 6/2006 | Shirakawa et al. |

\* cited by examiner

SYSTEM FOR CONTROLLING TRIGGERING OF ADSORBER REGENERATION

BACKGROUND

The present invention relates generally to exhaust treatment for an internal combustion engine and more particularly, but not exclusively, to a method, system, and software utilized to trigger desulfurization ("de-$SO_x$") to regenerate a $NO_x$ adsorber.

The Environmental Protection Agency ("EPA") is working aggressively to reduce pollution from new, heavy-duty diesel trucks and buses by requiring them to meet tougher emission standards that will make new heavy-duty vehicles up to 95% cleaner than older vehicles. Emission filters in the exhaust gas systems of internal combustion engines are used to remove unburned soot particles from the exhaust gas and to convert harmful pollutants such as hydrocarbons ("HC"), carbon monoxide ("CO"), oxides of nitrogen ("$NO_x$"), and oxides of sulfur ("$SO_x$") into harmless gases.

Exhaust gas is passed through a catalytic converter that is typically located between the engine and the muffler. In operation, the exhaust gases pass over one or more large surface areas that may be coated with a particular type of catalyst. A catalyst is a material that causes a chemical reaction to proceed at a usually faster rate without becoming part of the reaction process. The catalyst is not changed during the reaction process but rather converts the harmful pollutants into substances or gases that are not harmful to the environment.

$NO_x$ storage catalyst units or adsorbers are used to purify exhaust gases of combustion engines. These $NO_x$ storage catalyst units, in addition to storing or trapping $NO_x$, also trap and store unwanted $SO_x$ in the form of sulfates. The adsorption of $SO_x$ in the converter reduces the storage capacity of the adsorber and the catalytically active surface area of the catalyst. As such, $NO_x$ storage catalyst units must be regenerated to remove both $NO_x$ and $SO_x$. The process of regenerating $NO_x$ adsorbers varies depending on whether operating in a de-$NO_x$ mode (in which $NO_x$ is converted and removed from the unit) or a de-$SO_x$ mode (in which the unit is ran through a de-$SO_x$ process). Accordingly, there is a need for methods, systems and software for determining when to regenerate a $NO_x$ adsorber.

SUMMARY

One embodiment according to the present invention discloses a unique system for determining when to regenerate a $NO_x$ adsorber. Other embodiments include unique apparatuses, systems, devices, hardware, software, methods, and combinations of these for determining when to de-$SO_x$ an adsorber utilized to convert harmful pollutants formed as a byproduct of the combustion process in an internal combustion engine into non-harmful substances. Further embodiments, forms, objects, features, advantages, aspects, and benefits of the present invention shall become apparent from the following description and drawings.

DETAILED DESCRIPTION OF ILLUSTRATIVE EMBODIMENTS

Figure 1:
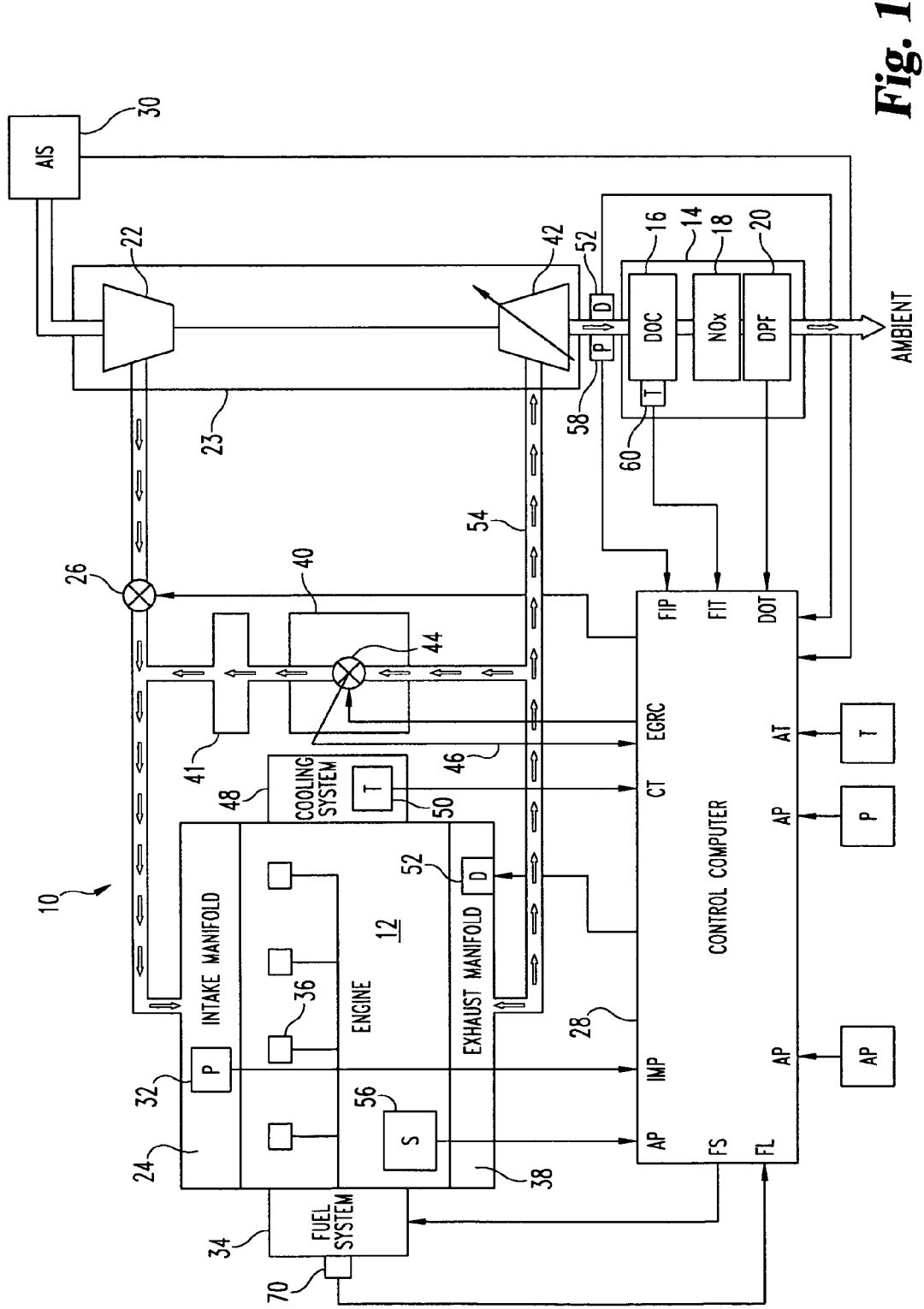
FIG. 1 is a schematic of a representative diesel engine system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

With reference to FIG. 1, there is illustrated, schematically, a system 10 that includes an internal combustion engine 12 operatively coupled with an exhaust filtration system 14. The exhaust filtration system 14 includes a diesel oxidation catalyst ("DOC") unit 16, a $NO_x$ adsorber or Lean $NO_x$ trap ("LNT") 18, and a diesel particulate filter ("DPF") 20. The exhaust filtration system 14 is operable to remove unwanted pollutants from exhaust gas exiting the engine 12 after the combustion process.

The DOC unit 16 is a flow through device that consists of a canister that may contain a honey-comb like structure or substrate. The substrate has a large surface area that is coated with an active catalyst layer. This layer may contain a small, well dispersed amount of precious metals such as, for example, platinum or palladium. As exhaust gas from the engine 12 traverses the catalyst, CO, gaseous HC and liquid HC particles (unburned fuel and oil) are oxidized, thereby reducing harmful emissions. The result of this process is that these pollutants are converted to carbon dioxide and water. In order to function properly, the DOC unit 16 must be heated to a minimum temperature value.

The $NO_x$ adsorber 18 is operable to absorb $NO_x$ created during the combustion process of the engine 12, thereby dramatically reducing the amount of $NO_x$ released into the atmosphere. The $NO_x$ adsorber 18 contains a catalyst that allows $NO_x$ to adsorb onto the catalyst. A byproduct of running the engine 12 in a lean mode is the production of harmful $NO_x$. The $NO_x$ adsorber 18 stores or absorbs $NO_x$ under lean engine operating conditions (lambda>1) and releases and catalytically reduces the stored $NO_x$ under rich engine operating conditions (lambda<1).

Under $NO_x$ regeneration, when the engine is operating under a rich condition at a predetermined temperature range, a catalytic reaction occurs. The stored $NO_x$ is catalytically converted to nitrogen ("$N_2$") and released from the $NO_x$ adsorber 18 thereby regenerating the $NO_x$ adsorber 18. The $NO_x$ adsorber 18 also has a high affinity for trapping sulfur and desulfation or de-$SO_x$, the process for the removal of stored sulfur from the $NO_x$ adsorber 18, also requires rich engine operation, but for a longer period of time and at much higher temperatures.

The DPF 20 may comprise one of several type of particle filters known and used in the art. The DPF 20 is utilized to capture unwanted diesel particulate matter ("DPM") from the flow of exhaust gas exiting the engine 12. DPM is sub-micron size particles found in diesel exhaust. DPM is composed of both solid and liquid particles and is generally classified into three fractions: (1) inorganic carbon (soot), (2) organic fraction (often referred to as SOF or VOF), and (3) sulfate fraction (hydrated sulfuric acid). The DPF 20 may be regenerated at regular intervals by combusting the particulates collected in the DPF 20 through exhaust manipulation or the like. Those skilled in the art would appreciate that, as it relates to the present invention, several different types of DPFs may be utilized in the present invention.

During engine operation, ambient air is inducted from the atmosphere and compressed by a compressor 22 of a turbocharger 23 before being supplied to the engine 12. The compressed air is supplied to the engine 12 through an intake manifold 24 that is connected with the engine 12. An air intake throttle valve 26 is positioned between the compressor 22 and the engine 12 that is operable to control the amount of charge air that reaches the engine 12 from the compressor 22. The air intake throttle valve 26 may be connected with, and controlled by, an electronic control unit ("ECU") 28, but may be controlled by other means as well. For the purpose of the present invention, it is important to note that the air intake throttle valve 26 is operable to control the amount of charge air entering the intake manifold 24 via the compressor 22.

An air intake sensor 30 is included either before or after the compressor 22 to monitor the amount of ambient air or charge air being supplied to the intake manifold 24. The air intake sensor 30 may be connected with the ECU 28 and generates electric signals indicative of the amount of charge air flow. An intake manifold pressure sensor 32 is connected with the intake manifold 24. The intake manifold pressure sensor 32 is operative to sense the amount of air pressure in the intake manifold 24, which is indicative of the amount of air flowing or provided to the engine 12. The intake manifold pressure sensor 32 is connected with the ECU 28 and generates electric signals indicative of the pressure value that are sent to the ECU 28.

The system 10 may also include a fuel injection system 34 that is connected with, and controlled by, the ECU 28. The purpose of the fuel injection system 30 is to deliver fuel into the cylinders of the engine 12, while precisely controlling the timing of the fuel injection, fuel atomization, the amount of fuel injected, as well as other parameters. Fuel is injected into the cylinders of the engine 12 through one or more fuel injectors 36 and is burned with charge air received from the intake manifold 24. Various types of fuel injection systems may be utilized in the present invention, including, but not limited to, pump-line-nozzle injection systems, unit injector and unit pump systems, common rail fuel injection systems and so forth.

Exhaust gases produced in each cylinder during combustion leaves the engine 12 through an exhaust manifold 38 connected with the engine 12. A portion of the exhaust gas is communicated to an exhaust gas recirculation ("EGR") system 40 and a portion of the exhaust gas is supplied to a turbine 42. The turbocharger 23 may be a variable geometry turbocharger 23, but other turbochargers may be utilized as well. The EGR system 34 is used to cool down the combustion process by providing a predetermined amount of exhaust gas to the charge air being supplied by the compressor 22. Cooling down the combustion process reduces the amount of $NO_x$ produced during the combustion process. An EGR cooler 41 may be included to further cool the exhaust gas before being supplied to the air intake manifold 22 in combination with the compressed air passing through the air intake throttle valve 26.

The EGR system 40 includes an EGR valve 44 this is positioned in fluid communication with the outlet of the exhaust manifold 38 and the air intake manifold 24. The EGR valve 44 may also be connected to the ECU 28, which is capable of selectively opening and closing the EGR valve 44. The EGR valve 44 may also have incorporated therewith a differential pressure sensor that is operable to sense a pressure change, or delta pressure, across the EGR valve 44. A pressure signal 46 may also be sent to the ECU 44 indicative of the change in pressure across the EGR valve 44. The air intake throttle valve 26 and the EGR system 40, in conjunction with the fuel injection system 34, may be controlled to run the engine 12 in either a rich or lean mode.

As set forth above, the portion of the exhaust gas not communicated to the EGR system 40 is communicated to the turbine 42, which rotates by expansion of gases flowing through the turbine 42. The turbine 42 is connected to the compressor 22 and provides the driving force for the compressor 22 that generates charge air supplied to the air intake manifold 24. Some temperature loss in the exhaust gas typically occurs as the exhaust gas passes through the turbine 42. As the exhaust gas leaves the turbine 42, it is directed to the exhaust filtration system 14, where it is treated before exiting the system 10.

A cooling system 48 may be connected with the engine 12. The cooling system 48 is a liquid cooling system that transfers waste heat out of the block and other internal components of the engine 12. Typically, the cooling system 48 consists of a closed loop similar to that of an automobile engine. Major components of the cooling system include a water pump, radiator or heat exchanger, water jacket (which consists of coolant passages in the block and heads), and a thermostat. As it relates to the present invention, the thermostat 50, which is the only component illustrated in FIG. 1, is connected with the ECU 28. The thermostat 50 is operable to generate a signal that is sent to the ECU 28 that indicates the temperature of the coolant used to cool the engine 12.

The system 10 includes a doser 52 that may be located in the exhaust manifold 38 and/or located downstream of the exhaust manifold 38. The doser 52 may comprise an injector mounted in an exhaust conduit 54. For the depicted embodiment, the agent introduced through the doser 52 is diesel fuel; however, other embodiments are contemplated in which one or more different dosing agents are used in addition to or in lieu of diesel fuel. Additionally, dosing could occur at a different location from that illustrated. For example, a fuel-rich setting could be provided by appropriate activation of injectors (not shown) that provide fuel to the engine in such a manner that engine 12 produces exhaust including a controlled amount of un-combusted (or incompletely combusted) fuel (in-cylinder dosing). Doser 52 is in fluid communication with a fuel line coupled to the same or a different fuel source (not shown) than that used to fuel engine 12 and is also connected with the ECU 28, which controls operation of the doser 52.

The system 10 also includes a number of sensors and sensing systems for providing the ECU 28 with information relating to the system 10. An engine speed sensor 56 may be included in or associated with the engine 12 and is connected with the ECU 28. The engine speed sensor 56 is operable to produce an engine speed signal indicative of engine rotation speed ("RPM") that is provided to the ECU 28. A pressure sensor 58 may be connected with the exhaust conduit 54 for measuring the pressure of the exhaust before it enters the exhaust filtration system 14. The pressure sensor 58 may be connected with the ECU 28. If pressure becomes too high, this may indicate that a problem exists with the exhaust filtration system 14, which may be communicated to the ECU 28.

At least one temperature sensor 60 may be connected with the DOC unit 16 for measuring the temperature of the exhaust gas as it enters the DOC unit 16. In other embodiments, two temperature sensors 60 may be used, one at the entrance or upstream from the DOC unit 16 and another at the exit or downstream from the DOC unit 60. These temperature sensors are used to calculate the temperature of the DOC unit 16. In this alternative, an average temperature may be determined, using an algorithm, from the two respective temperature readings of the temperature sensors 60 to arrive at an operating temperature of the DOC unit 60.

Figure 2:
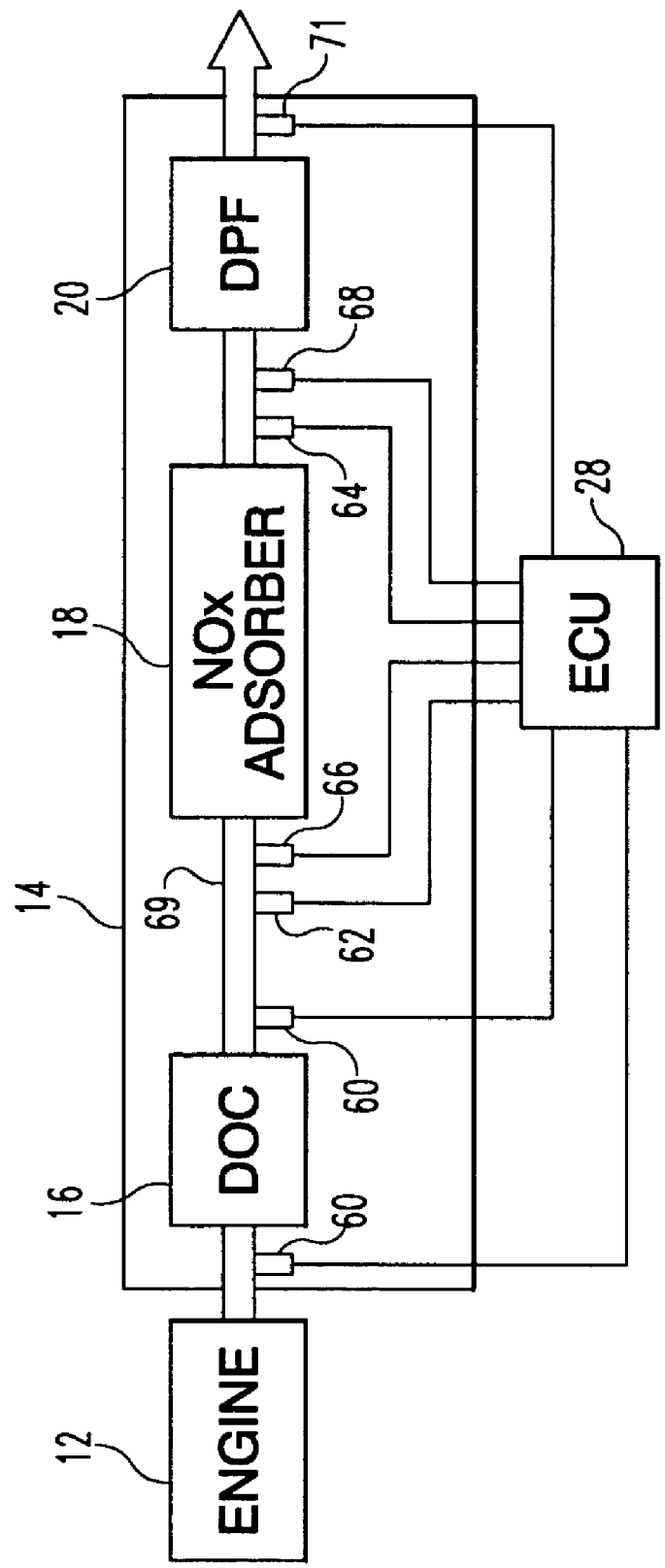
FIG. 2 is a more detailed schematic of the exhaust system of the representative diesel engine system.

Referring to FIG. 2, a more detailed diagram of the exhaust filtration system 14 is depicted connected in fluid communication with the flow of exhaust leaving the engine 12. A first $NO_x$ temperature sensor 62 may be in fluid communication with the flow of exhaust gas before entering or upstream of the $NO_x$ adsorber 18 and is connected to the ECU 28. A second $NO_x$ temperature sensor 64 may be in fluid communication with the flow of exhaust gas exiting or downstream of the $NO_x$ adsorber 18 and is also connected to the ECU 28. The $NO_x$ temperature sensors 62, 64 are used to monitor the temperature of the flow of gas entering and exiting the $NO_x$ adsorber 18 and provide electric signals that are indicative of the temperature of the flow of exhaust gas to the ECU 28. An algorithm may then be used by the ECU 28 to determine the operating temperature of the $NO_x$ adsorber 18.

A first universal exhaust gas oxygen ("UEGO") sensor or lambda sensor 66 may be positioned in fluid communication with the flow of exhaust gas entering or upstream from the $NO_x$ adsorber 18 and a second UEGO sensor 68 may be positioned in fluid communication with the flow of exhaust gas exiting or downstream of the $NO_x$ adsorber 18. The UEGO sensors 66, 68 are connected with the ECU 28 and generate electric signals that are indicative of the amount of oxygen contained in the flow of exhaust gas. The UEGO sensors 66, 68 allow the ECU 28 to accurately monitor air-fuel ratios ("AFR") also over a wide range thereby allowing the ECU 28 to determine a lambda value associated with the exhaust gas entering and exiting the $NO_x$ adsorber 18. In alternative embodiments, the UEGO sensors 66, 68 may comprise $NO_x$ sensors 66, 68 that are used to monitor $NO_x$ levels entering and leaving the $NO_x$ adsorber 18.

Referring back to FIG. 1, an ambient pressure sensor 72 and an ambient temperature sensor 74 may be connected with the ECU 28. The ambient pressure sensor 72 is utilized to obtain an atmospheric pressure reading that is provided to the ECU 28. As known in the art, as elevation increases, there are exponentially fewer and fewer air molecules. Therefore, atmospheric pressure decreases with increasing altitude at a decreasing rate. The ambient temperature sensor 74 is utilized to provide the ECU 28 with a reading indicative of the outside temperature or ambient temperature. As set forth in greater detail below, when the engine 12 is operating outside of calibrated ambient conditions (i.e.—above or below sea level and at ambient temperatures outside of approximately 60-80° F.) the present invention may utilize a closed-loop control module to maintain the bed temperature of the $NO_x$ adsorber 18 at the preferred regeneration temperature value (e.g. –650° C.).

Figure 3:
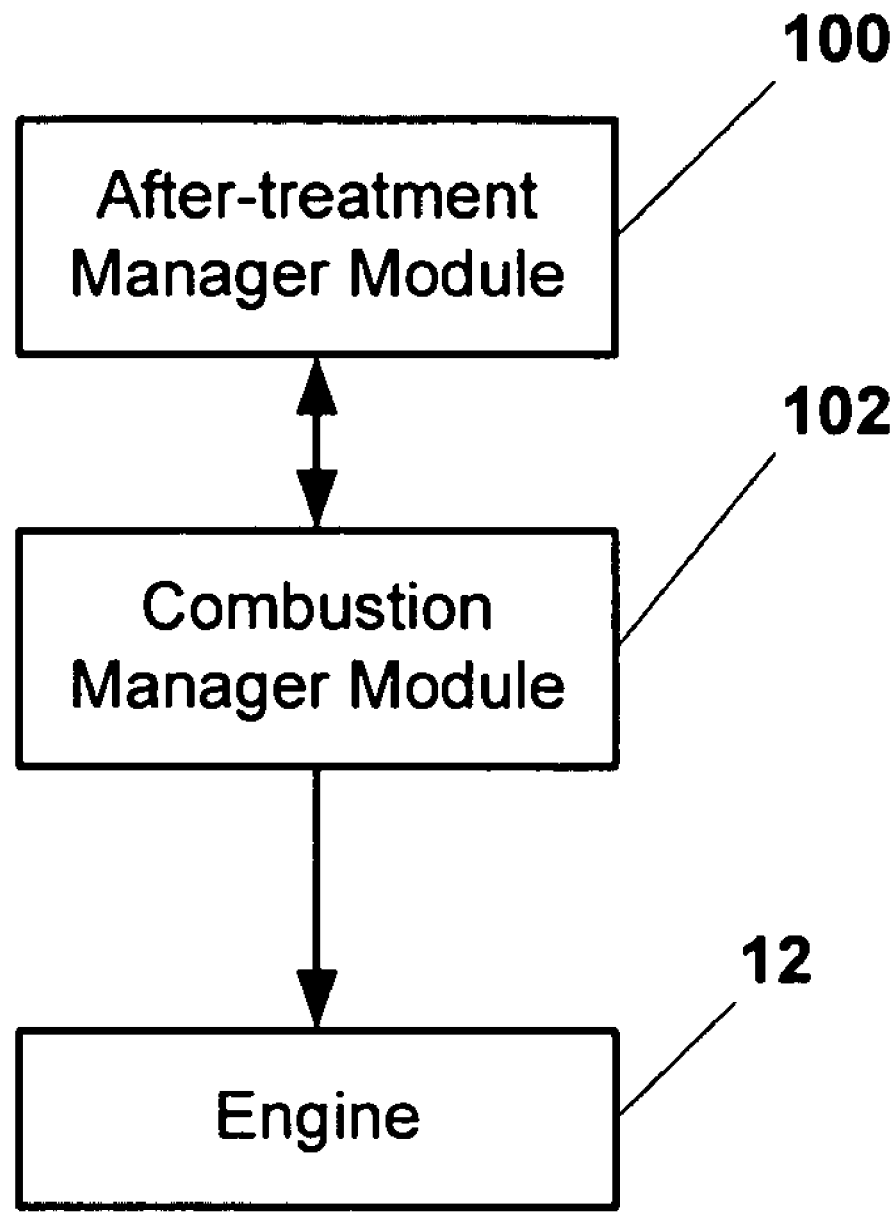
FIG. 3 illustrates an after-treatment manager module and a combustion manager module that are associated with an internal combustion engine.

Referring to FIG. 3, the system 10 includes an after-treatment manager module or software routine 100 and a combustion manager module or software routine 102 that are executable by the ECU 28 or may be used in conjunction with the ECV 28 to trigger and control a regeneration process. The after-treatment manager module 100 is responsible for, amongst other things, desulfation of the $NO_x$ adsorber 18. After a predetermined period of engine operation, the $NO_x$ adsorber 18 requires regeneration to remove $SO_x$ (referred to interchangeably as sulfur) that builds up on or is trapped by the $NO_x$ adsorber 18. The after-treatment manager module 100 uses engine management to control the air fuel ratio at the inlet 69 of the $NO_x$ adsorber 18 with lean/rich cycling to provide reductant to regenerate sulfur that has been captured or trapped by the $NO_x$ adsorber 18.

The after-treatment manager module 100 instructs the combustion manager module 102 to control the engine 12 such that the air fuel ratio value or exhaust lambda value at the inlet 69 of the $NO_x$ adsorber 18 is selectively cycled to provide reductant to regenerate the $NO_x$ adsorber 18. At the inlet 69, the exhaust lambda is controlled through engine management to switch or cycle at a controlled frequency between lean and rich lambda values. In one embodiment, the exhaust has a lean lambda target value of approximately 1.20 and a rich lambda target value of approximately 0.95. The combustion manager module 102 controls the duty cycle of the exhaust lambda at the inlet 69 of the $NO_x$ adsorber 18 to a lean lambda value for a first predetermined period of time and a rich lambda value for a second predetermined period of time to regenerate the $NO_x$ adsorber 18. The UEGO sensor 66 at the inlet 69 of the $NO_x$ adsorber 18 is used by the ECU 28 to monitor the exhaust lambda value entering the $NO_x$ adsorber 18.

Figure 4:
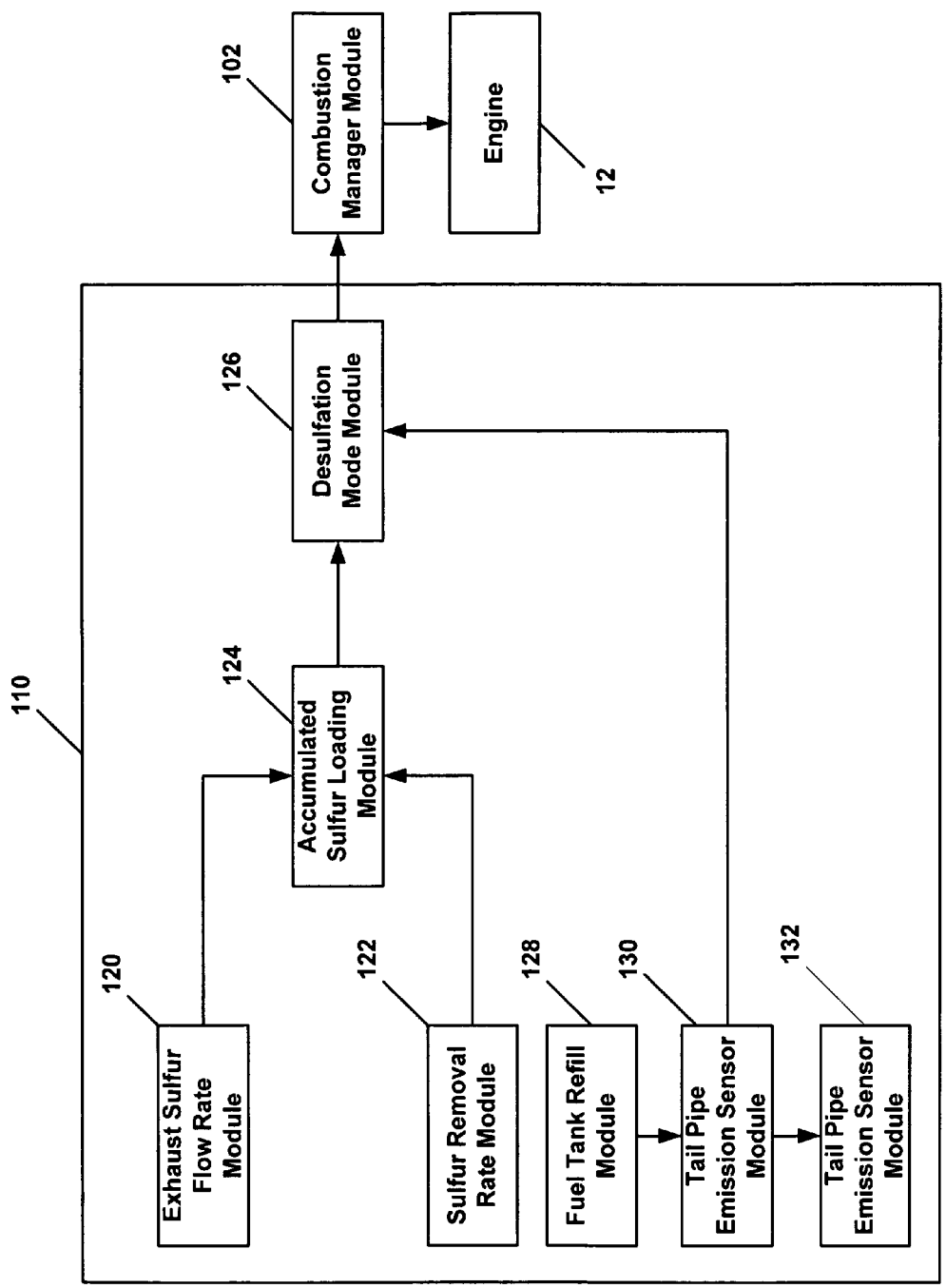
FIG. 4 is a detailed illustration of the desulfation trigger module of the after-treatment manager module.

Referring to FIG. 4, the after-treatment manager module 100 includes a desulfation trigger module 110. The desulfation trigger module 110 is used to estimate the accumulated $SO_x$ on the $NO_x$ adsorber 18. The accumulated $SO_x$ is estimated based on the consumed fuel mass, assuming a known sulfur concentration in diesel fuel, and by a tailpipe emission sensor 68, 71 (see FIG. 2) like a $NO_x$ or oxygen sensor. The desulfation trigger module 110 also takes into account $SO_x$ deposited from engine oil as a multiplication factor acting on the $SO_x$ accumulation rate due to the flow of fuel. The estimation also takes into account the residual sulfur left over from the last regeneration event. When the estimated accumulated $SO_x$ loading exceeds a certain upper threshold, a desulfation mode is triggered and set into place in which the combustion manager module 102 controls the engine 12 such that accumulated $SO_x$ is removed from the $NO_x$ adsorber 18. As such, the desulfation mode is used to remove the accumulated $SO_x$.

As illustrated, the desulfation trigger module 110 includes an exhaust sulfur flow rate module 120 that is operable to generate an estimate of a sulfur accumulation rate associated with the $NO_x$ adsorber 18 as a function of a flow of fuel. Starting in 2007, the diesel market in North America shall provide diesel fuel with 15 parts per million ("ppm") sulfur concentration by weight. With this known sulfur concentration, the exhaust sulfur flow rate module 120 is operable to calculate an exhaust sulfur flow rate estimation. In one embodiment, the exhaust sulfur flow rate is modeled by the exhaust sulfur flow rate module 120 as follows:

$$M_{SOx} = M_{SOx}(\text{fuel}) * M_{SOx}(\text{oil})$$

As such, the exhaust sulfur flow rate module 120 makes a calculation of the amount of sulfur accumulated in the $NO_x$ adsorber 18 as a function of an amount of $SO_x$ deposited by fuel consumption or a flow of fuel and an amount of $SO_x$ deposited by oil.

In another embodiment, the exhaust sulfur flow rate module 120 may be modeled by the exhaust sulfur flow rate module 120 as follows:

$$M_{SOx} = (\text{fuel} * 15 \text{ ppm} * 10^{-6}) * \text{scale}$$

wherein fuel flow ("fuel") is calculated as follows:

$$\text{fuel} = \text{total\_fueling} * \text{RPM} * \text{number of engine cylinders}/2/540476.19$$

The total_fueling variable is a variable that is determined by the exhaust sulfur flow rate module 120 by obtaining a total amount of fuel injected into the cylinders of the engine 12. The combustion manager module 102 keeps track of the total amount of fuel injected into the cylinders of the engine 12 as it controls the fuel system 34. The RPM or engine speed variable is obtained by the ECU 28 for use by the exhaust sulfur flow rate module 120 from the speed sensor 56.

The result of the total fueling value being multiplied by the engine speed and the number of engine cylinders is divided by two (2) because there are two revolutions per cycle. The "scale" variable is a predetermined calibrated value that consists of a multiplication factor relating to the amount of $SO_x$ deposited by the consumption of engine oil.

Figure 5:
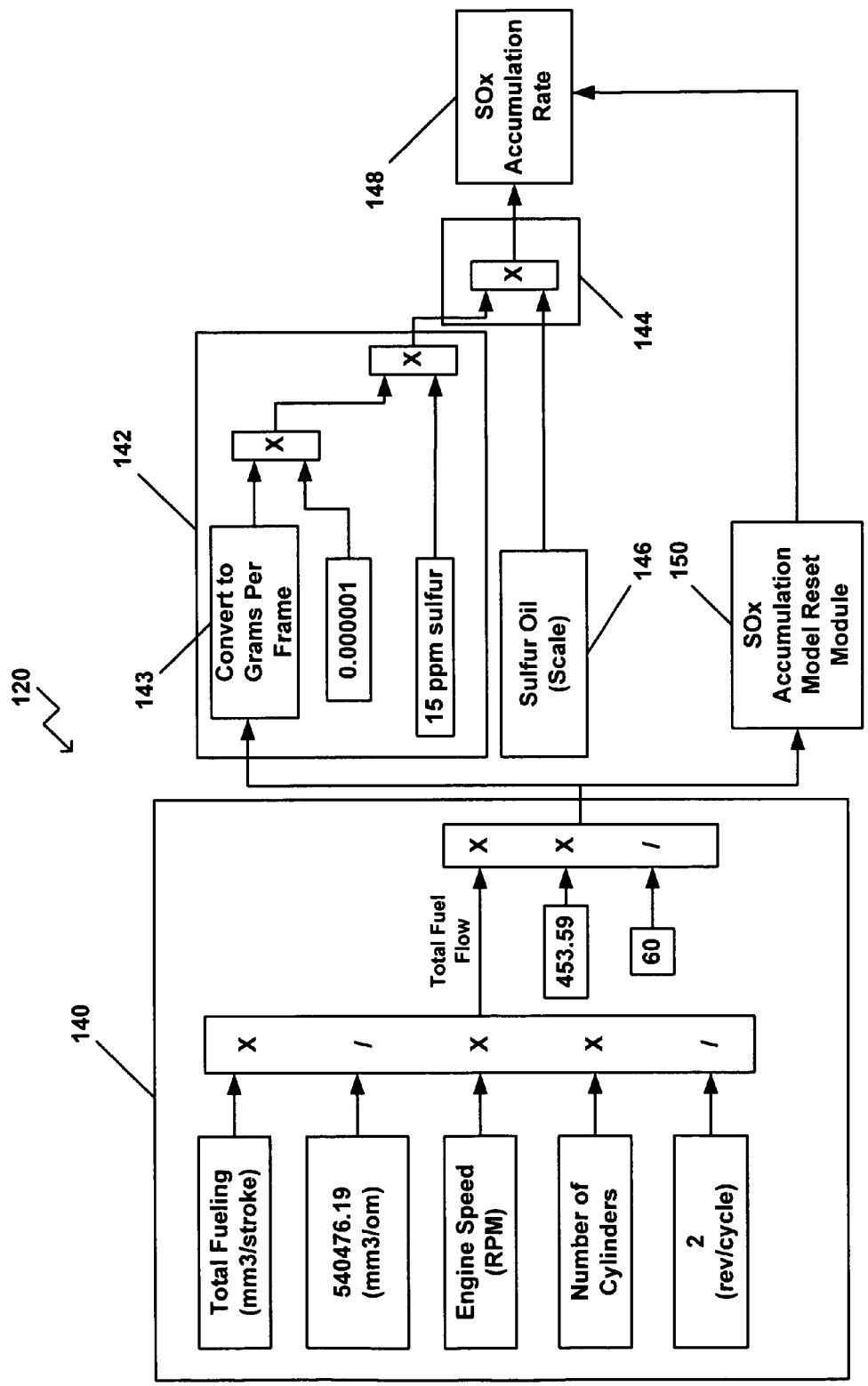
FIG. 5 is a detailed illustration of an exhaust sulfur flow rate module.

Referring to FIG. 5, the exhaust sulfur flow rate module 120 includes a fuel flow calculation module 140 that is operable to calculate a total fuel flow value associated with the engine 12. In one embodiment, the total fuel flow value associated with the engine 12 is output from the fuel flow calculation module 140 in grams per second ("grams/second"). In this embodiment, the fuel flow calculation module 140 calculates the amount of fuel consumed by the engine 12 as follows:

$$\text{total fuel flow} = (\text{total\_fueling}/540476.19) * \text{engine speed} * \text{number of cylinders}/2$$

In order to get the total fuel flow in grams per second, the following calculation occurs once the total fuel flow value is obtained:

$$\text{total fuel flow(grams/second)} = \text{total fuel flow} * 453.59/60$$

As such, the fuel flow calculation module 140 generates a total fuel flow value per second.

The exhaust sulfur flow rate module 120 also includes a sulfur fuel flow calculator module 142 that is operable to take the total fuel flow value per second generated by the fuel flow calculation module 140 and generate a sulfur accumulation value as a function of the total fuel flow value. As illustrated, in this embodiment, the sulfur accumulation value from fuel flow is calculated by taking the total fuel flow value per second and converting that value into a grams per frame value with a conversion module 143. The sulfur accumulation value from fuel flow is then calculated as follows:

$$M_{SOx}(\text{fuel}) = \text{Fuel Grams Per Frame} * 10^{-6} * 15 \text{ ppm}$$

As previously set forth, starting in 2007 diesel fuel in North America will contain 15 ppm sulfur concentration by weight. As such, the sulfur accumulation value from fuel flow is calculated as a function of the grams of fuel that flow per frame and the amount of sulfur contained in a gram of fuel. The amount of sulfur contained in fuel may vary in other regions and as such, other values other than 15 ppm may be used in other embodiments of the invention.

The sulfur accumulation value from fuel flow that is determined by the sulfur fuel flow calculator module 142 is provided as an input to a total sulfur calculator 144. A sulfur accumulation value from oil 146 is also provided as an input to the total sulfur calculator 144. As previously set forth, the sulfur deposited from engine oil is counted as a multiplication factor acting on the sulfur accumulation rate due to fuel in one embodiment of the invention. The total sulfur calculator 144 is operable to generate a $SO_x$ accumulation rate value due to fuel flow or consumption and oil, which is represented as element 148.

The exhaust sulfur flow rate module 120 also includes a sulfur accumulation model reset module 150. The sulfur accumulation model reset module 150 causes the exhaust sulfur flow rate module 120 to estimate the sulfur loading rate on the $NO_x$ adsorber 18 more aggressively. This higher sulfur load estimation causes the system 10 to execute sulfur regeneration longer to deep clean the $NO_x$ adsorber 18. The sulfur accumulation model reset module 150 operates as a function of the following equation:

$$M_{fuel} = \int \text{fuel flow} * dt > \text{threshold\_1 \&}$$
$$M_{SOx} > \text{threshold\_2}$$

Whenever a total consumed fuel mass exceeds a predetermined threshold and the accumulated sulfur estimate exceeds a second predetermined threshold, the sulfur accumulation model reset module 150 shall estimate sulfur loading more aggressively to thereby cause the combustion manager module 102 to deep clean the $NO_x$ adsorber 18. In one embodiment, this causes the counter to increase to a higher level or value, which causes the regeneration process to go longer. The regeneration process occurs until the counter reaches a predetermined low threshold value.

Referring back to FIG. 4, the desulfation trigger module 110 also includes a sulfur removal rate module 122. During desulfation mode, which is controlled by the combustion manager module 102, the temperature of the exhaust gas exiting the engine 12 and entering the $NO_x$ adsorber 18 is controlled above 625° C. and preferentially, at around 650° C. The inlet air fuel ratio ("AFR") is controlled such that a lambda value associated with the exhaust gas entering the inlet 69 of the $NO_x$ adsorber 18 is controlled at around 0.98, but preferentially, at around 0.95. A lean/rich cycling of the AFR is also done to eliminate $H_2S$ slip. The sulfur removal rate at regeneration is estimated by a function of:

$$M_{SOx} = f(M_{SOx}, \text{Catalyst\_Bed\_Temperature}, O_2\% < 0)$$

where the Catalyst_Bed_Temperature is estimated by obtaining readings from the first and second $NO_x$ temperature sensors 62, 64 and the oxygen percentage is obtained from reading the first UEGO or lambda sensor 66. As such, during desulfation, the sulfur removal rate module 122 is operable to generate an estimate of the sulfur removal rate that is utilized by a accumulated sulfur loading module 124.

Figure 6:
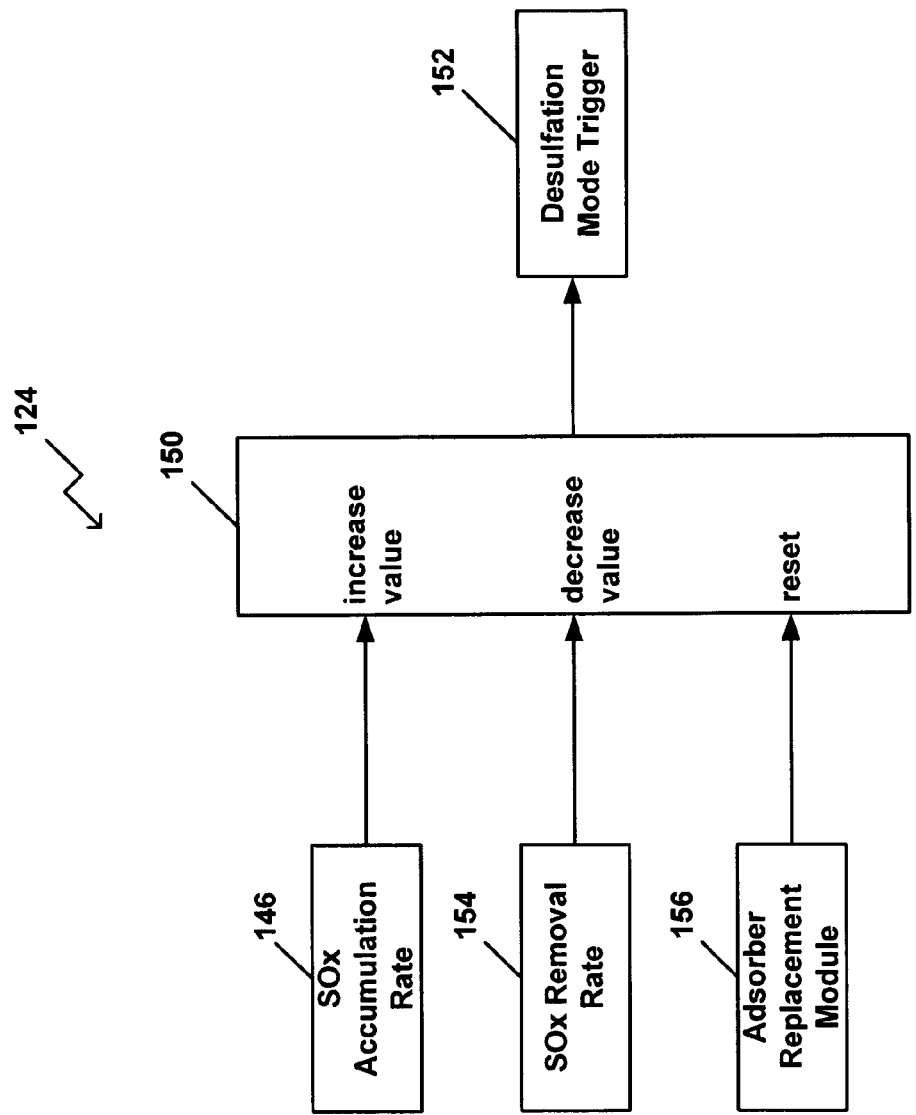
FIG. 6 is a detailed illustration of an accumulated sulfur loading module.

Referring to FIG. 6, the accumulated sulfur loading module 124 includes a counter module 150 that is operable to generate or enable a desulfation mode trigger 152 once estimated the accumulated sulfur amount reaches a predetermined upper threshold value. The counter module 150 increases a counter value or counts up as a function of the $SO_x$ accumulation rate 146. In other words, the higher the $SO_x$ accumulation rate 146, the faster the counter module 150 increases the value of the counter. Once the value of the counter reaches the predetermined upper threshold value, the counter module 150 enables the desulfation mode trigger 152.

During desulfation mode, the counter module 150 decreases the value of the counter or counts down as a function of an estimated $SO_x$ removal rate value 154 generated by the sulfur removal rate module 122. The higher the $SO_x$ removal rate, the faster the counter module 150 counts down. Once the counter reaches a predetermined low threshold value, the counter module 150 disables the desulfation mode trigger 152. An adsorber replacement module 156 is included so that the value of the counter may be reset back to zero, or another predetermined starting point, in the event that a new NO$_x$ adsorber 18 is placed in the system 10.

Referring back to FIG. 4, a desulfation mode module 126 is included that is operable to trigger the combustion manager module 102 to enter a desulfation mode of operation. Once the desulfation mode trigger 152 is enabled, the desulfation mode module 126 causes the combustion manager module 102 to control the engine 12 such that exhaust gas entering the NO$_x$ adsorber 18 is controlled to heat up and maintain the NO$_x$ adsorber 18 at approximately 650° C. and at a lambda value that selectively cycles between approximately 0.95 and 1.20. This causes SO$_x$ to be removed from the NO$_x$ adsorber 18.

Referring to FIG. 1, the system 10 may also include a fuel level sensor 70. The fuel level sensor 70 is operable to generate electric signals as a function of the level of fuel in a fuel tank of the fuel system 34. Block 34 should be construed herein for the purposes of the following discussion as a fuel tank and fuel system. Those skilled in the art would recognize that various types of sensors may be used to detect fuel levels in fuel tanks.

Referring back to FIG. 4, the desulfation trigger module 110 may include a fuel tank refill module 128 and a tail pipe emission sensor module 130. The fuel tank refill module 128 performs a hypothesis test each time after the engine 12 starts to detect whether the fuel level in the fuel tank 34 has increased from the time the engine 12 was shut off. The fuel tank refill module 128 tracks the status of the fuel level by monitoring the fuel tank sensor 70. If the level of fuel has increased from the time the engine 12 was stopped, a refill is detected and a status flag is set by the fuel tank refill module 128.

If a refill is detected and the efficiency of the NO$_x$ adsorber 18 noticeably decreases, the tail pipe emission sensor module 130 may trigger an alarm or indication 132 that indicates that a wrong fuel type with a high sulfur concentration may have been used to fill the fuel tank 34. This may require the driver to send the vehicle to a distributor for a lab test of the fuel. The NO$_x$ adsorber 18 conversion efficiency is calculated by the tail pipe emission sensor module 130 as follows:

$$NOx_{eff}=1-CatOutNOx/CatInNox<c$$

where the catalyst inlet NOx is measured by the first NO$_x$ sensor 66, the catalyst outlet NOx is measured by the second NO$_x$ sensor 68 and "c" is a calibrated efficiency value.

Another function performed by the tail pipe emission sensor module 130 is, as set forth above, to monitor the efficiency of the NO$_x$ adsorber 18 during normal operation. If a drop in efficiency is detected, a signal may be sent to the desulfation mode module 126 that causes it to have the combustion manager module 102 to enter into the desulfation mode. As such, the present invention may control desulfation by using both a sulfur loading model and a tail pipe emission sensor.

In one embodiment of the present invention, the modules described herein may comprise software modules or routines that are executable by the ECV 28. In alternative embodiments of the present invention some of the modules described herein may be replaced by electronic circuits, which may comprise analog and digital circuitry. In other embodiments, the modules may comprise a combination of electronic circuits and microprocessor based components. As such, use of the term module herein should be broadly construed to include one or more of these combinations as well as software designed to provide the functionality described herein.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an exhaust sulfur flow rate module for estimating a sulfur accumulation rate associated with an adsorber as a function of a flow of fuel and an engine oil consumption factor;
   a sulfur removal rate module for estimating a sulfur removal rate associated with said adsorber;
   an accumulated sulfur loading module including a counter, wherein said counter increases in value as a function of said sulfur accumulation rate and decreases in value as a function of said sulfur removal rate; and
   a combustion manager module for controlling an engine to regenerate said adsorber once said counter reaches a predetermined upper threshold value.

2. The system of claim 1, wherein said engine oil consumption factor acts as a multiplication factor on said sulfur accumulation rate.

3. The system of claim 1, wherein said flow of fuel is estimated at least in part as a function of a total fueling value, a sensed engine speed, and a number of cylinders of said engine.

4. The system of claim 1, wherein said flow of fuel contains a known concentration by weight of sulfur.

5. The system of claim 1, wherein said sulfur removal rate is estimated at least in part as a function of an accumulated amount of sulfur, a temperature value of said adsorber during regeneration, and a measured air fuel ratio value at an inlet of said adsorber.

6. The system of claim 1, further comprising a tail pipe emission sensor module for determining an efficiency value associated with said adsorber.

7. The system of claim 6, wherein said combustion manager module regenerates said adsorber if said efficiency value drops below a predetermined low threshold value.

8. The system of claim 1, further comprising a fuel tank refill module for detecting when a fuel tank is refilled with fuel.

9. The system of claim 8, further comprising a tail pipe emission sensor module for determining an efficiency value associated with said adsorber, wherein if said efficiency value drops below a predetermined low threshold value after a fuel tank refill an indication of a wrong fuel type is generated by said tail pipe emission sensor module.

10. A method, comprising the steps of:
    estimating a sulfur accumulation rate associated with an adsorber as a function of a flow of fuel to an engine and an engine oil consumption factor;
    estimating a sulfur removal rate associated with said adsorber during an adsorber regeneration process;

increasing a value of a counter as a function of said sulfur accumulation rate;

decreasing said value of said counter as a function of said sulfur removal rate; and triggering said adsorber regeneration process for said adsorber once said counter reaches a predetermined upper threshold value.

11. The method of claim 10, wherein said flow of fuel is calculated at least in part as a function of a total fueling value, an engine speed value, and a number of cylinders of said engine.

12. The method of claim 10, wherein said step of estimating said sulfur accumulation rate comprises multiplying said flow of fuel by said engine oil consumption factor.

13. The method of claim 10, further comprising the step of resetting said counter if said adsorber is replaced by a new adsorber.

14. The method of claim 10, further comprising the step of detecting a fuel refill.

15. The method of claim 14, further comprising the step of monitoring a conversion efficiency value associated with said adsorber.

16. The method of claim 15, further comprising the step of generating a warning if said conversion efficiency value falls below a predetermined low threshold value.

17. The method of claim 10, further comprising the step of estimating said sulfur accumulation rate more aggressively once a consumed fuel mass and an accumulated amount of sulfur exceed a predetermined threshold value so that said value of said counter is increased to a higher level.

18. The method of claim 10, further comprising the step of stopping said regeneration process once said value of said counter reaches a predetermined low threshold value.

19. A system, comprising:

an exhaust sulfur flow rate module for generating a sulfur flow rate value associated with a flow of fuel and an engine oil consumption factor;

a sulfur removal rate module for generating a sulfur removal rate value associated with a regeneration process;

an accumulated sulfur loading module for tracking an accumulated sulfur value associated with an adsorber as a function of said sulfur flow rate value and said sulfur removal rate value; and a combustion manager module for regenerating said adsorber when said accumulated sulfur value exceeds an upper threshold limit.

20. The system of claim 19, wherein said flow of fuel is calculated at least in part as a function of a total fueling value, an engine speed value, and a number of cylinders.

21. The system of claim 19, further comprising an accumulation model reset module for increasing said accumulated sulfur value to deep clean said adsorber.

22. The system of claim 19, wherein said accumulated sulfur loading module tracks said accumulated sulfur value by increasing a counter value as a function of said sulfur flow rate value and decreasing said counter value as a function of said sulfur removal rate value.

23. The system of claim 1, The method of claim 10, wherein said flow of fuel is determined by obtaining a total amount of fuel injected into more two or more engine cylinders, engine speed, and a total number of engine cylinders to obtain a first fuel value, wherein said first fuel value is divided by two (2).

24. The method of claim 10, wherein said flow of fuel is determined by obtaining a total amount of fuel injected into more two or more engine cylinders, engine speed, and a total number of engine cylinders to obtain a first fuel value, wherein said first fuel value is divided by two (2).

* * * * *